Patented Feb. 27, 1940

2,191,800

UNITED STATES PATENT OFFICE 2,191,800

AZO COMPOUNDS

Arthur R. Murphy, deceased, late of Penns Grove, N. J., by Margaret R. Murphy, administratrix, Penns Grove, N. J., and Swanie S. Rossander, Wilmington, Del., assignors to E. I. du Pont de Nemours & Company, Wilmington, Del., a corporation of Delaware No Drawing. Application August 26, 1937,
Serial No. 161,037

7 Claims. (Cl. 260—160)

This invention relates to azo compounds which are soluble and substantive to cotton, regenerated cellulose and similar materials and which after being dyed on the fiber can be diazotized and coupled with azo dye coupling components to form dyes having improved washing fastness and excellent discharge properties, and especially to compounds having a diaryl-diazo bridging group coupled to two phenyl-azo-pyrazolone groups, the latter groups being coupled to primary arylamines as end groups, thus giving two end groups which are diazotizable.

It is among the objects of the invention to provide soluble dyestuffs which are substantive to cotton, regenerated cellulose and related materials which can be diazotized on the fiber and coupled with azo dye coupling components to give dyeings of superior fastness to washing. Another object is to provide dyestuffs which have good discharge properties after they are developed on the fiber. Another object is to provide processes for making the dyestuffs. Other objects of the invention will be apparent from the following description:

The objects of the invention are attained in general by producing azo compounds of the general type

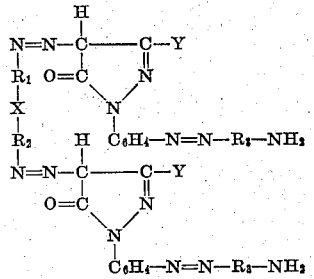

in which —R₁—X—R₂— has two aryl groups, R₁ and R₂ which are joined directly or by an intervening group —X— which may consist of any of the groups

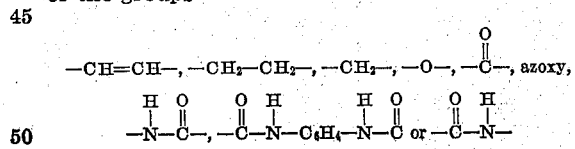

and R₁ and R₂ are substituted or unsubstituted benzene or naphthalene nuclei; Y represents alkyl or carboxyl; and R₃ is the aryl nucleus of an azo dye coupling component substituted by a diazotizable amino group.

The invention will be more fully understood by reference to the following description and to the examples which illustrate but do not limit the invention.

Example 1

5.5 parts of para amino benzoyl meta phenylene diamine which were slurried with 300 parts of water were dissolved by adding 12½ parts of 10 normal hydrochloric acid and cooled to 5° C. 25 parts of 2 normal sodium nitrite were added as rapidly as the nitrite was absorbed, and an excess of nitrite was maintained for 20 minutes while cooling to 0°-5° C.

A solution of 12.2 parts of 1-meta-aminophenyl-5-pyrazolone-3-carboxylic acid in 500 parts of water was made, and the solution was made slightly alkaline to brilliant yellow paper by adding soda ash. Then 80 parts of 2 normal soda ash solution were added and the solution was cooled to 5° C.

The tetrazo of para-amino-benzoyl-meta-phenylene-diamine was slowly added to the solution of 1-meta-amino-phenyl-5-pyrazolone-3-carboxylic acid while maintaining strong alkalinity to brilliant yellow paper and an excess of the coupling component. The mixture was stirred 3 hours and warmed to 75° C. Salt (10% by weight of the solution) was added. The mixture was stirred ½ hour and filtered.

The coupling product was slurried with 800 parts of water for 4 hours and 25 parts of 2 normal sodium nitrite were added. The mixture was stirred rapidly while adding 18 parts of 10 normal hydrochloric acid and an excess of nitrite was maintained for 2 hours while keeping the temperature at 20-23° C. The excess nitrite was removed by adding a small amount of urea.

A solution of 11.9 parts mixed Cleve's acid in 500 parts of water was made by slowly adding soda ash (approximately 2.8 parts) until the Cleve's acid was dissolved to a clear solution which was slightly acid to litmus. The solution of Cleve's acid was added to the above tetrazo body and 20 parts of sodium acetate were immediately added. This solution was neutral to Congo red paper and was stirred 4 hours at 20–25° C. Then soda ash was slowly added to the mixture during one hour until it was slightly alkaline to brilliant yellow paper and it was stirred one hour. The mixture was slowly warmed to 80° C. and made distinctly alkaline to brilliant yellow paper by adding more soda ash. Salt (twenty per cent by volume) was added to a fairly clear rim and the precipitate was filtered. The product was then dried at 90°–100° C. The product was brown in appearance. The probable formula of the dye is:

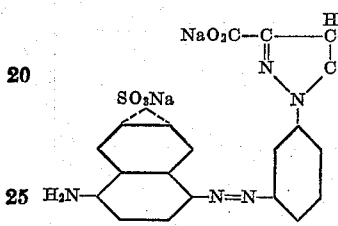

This compound was soluble in water and was capable of being diazotized by methods well known in the art.

It was substantive to fibers of cotton and regenerated cellulose and when fabrics of these materials were dyed with the compound and diazotized on the fibre a dye having superior fastness to washing was produced by development with azo dye coupling components such as beta naphthol, 1-phenyl-3-methyl-5-pyrazolone, resorcinol, meta-tolylene-diamine and the like. These dyes were discharged with a discharging agent and pure whites were produced.

ylic acid was maintained. The mixture was stirred 3 hours, slowly warmed to 75° C. and salt was added (10% by weight of the solution). The mixture was stirred ½ hour and filtered.

The residue was stirred with 800 parts of water for four hours to a fine slurry and 23 parts of 10 normal hydrochloric acid were added. Then 30 parts of 2 normal sodium nitrite were added and the mixture was stirred 3 hours at 20–25° C. with a strong excess of nitrite.

19.8 parts of para-amino-benzoyl-J-acid in 400 parts of water were stirred to a smooth slurry and ammonia (approximately 4½ cc. of 27%)

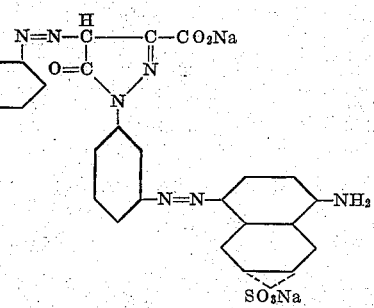

was added to complete solution which was slightly alkaline to brilliant yellow paper. 200 parts of 2 normal soda ash solution were added and the mixture was cooled to 10° C. The previously prepared tetrazo solution was slowly added to the para-amino-benzoyl-J-acid solution while maintaining strong alkalinity to brilliant yellow paper and an excess of para-amino-benzoyl-J-acid in the mixture. The mixture was stirred 4 hours, slowly warmed to 75° C., salted and filtered. The product was dried at 90–95° C. It was a reddish dry powder. Its probable formula is

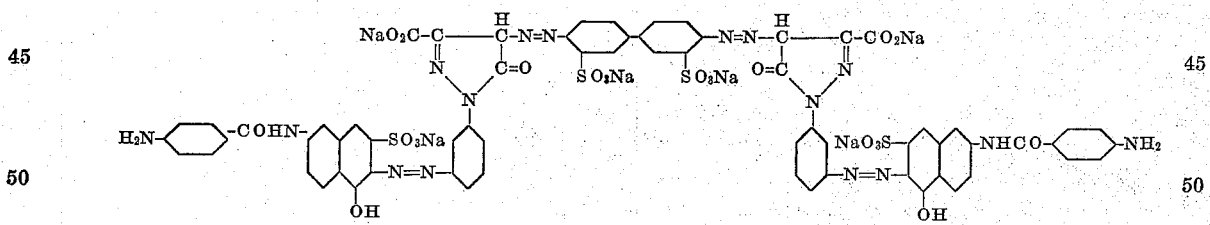

Example 2

9.7 parts of benzidine 3:3′-disulfonic acid were dissolved in 300 parts of water at 20° C. with the minimum amount of soda ash necessary and cooled to 5° C. 18 parts of 10 normal hydrochloric acid were added and then 25 parts of 2 normal sodium nitrite were added as rapidly as the nitrite was absorbed. Acidity to Congo red paper and a slight excess of nitrite were maintained for ½ hour at a temperature of 5° C.

12 parts of 1-meta-amino-phenyl-5-pyrazolone-3-carboxylic acid were slurried in 500 parts water at 20° C. and soda ash was added until the solution was slightly alkaline to brilliant yellow paper. Then 110 parts 2 normal soda ash solution were added and the solution was cooled to 10° C.

The tetrazo of benzidine 3:3′-disulfonic acid was added to the alkaline solution of 1-meta-amino-phenyl-5-pyrazolone-3-carboxylic acid during 15 minutes, while the mixture was kept alkaline to brilliant yellow paper and an excess of 1-meta-amino-phenyl-5-pyrazolone-3-carbox- Except for small differences in shade this product had the desirable properties of the product of Example 1.

The following compounds were made by procedures similar to the procedures of the above examples and they had similar desirable properties. In the following examples the compositions of the dyes are indicated by the grouping of the intermediates used in their preparation. The compounds under the heading "1st component" were diazotized and coupled to two moles of the compounds listed opposite thereto under the heading "2nd component". The disazo compound resulting from such coupling was diazotized and coupled to two moles of the amines under the heading "3rd component". The fiber was dyed with the tetrakisazo compound resulting from the last coupling giving colors of direct dyeings under the heading "Direct". The direct dyeing was then subjected to tetrazotization and the final dye was developed with beta-naphthol, giving colors under the heading "Developed". The dyes, in general, are characterized by their fastness to washing and their excellent discharge properties.

The pyrazolone group is a 1-(amino-phenyl)-5-pyrazolone compound which in the benzene nu-

| | 1st component | 2nd component (2 moles) | 3rd component (2 moles) | Shades of dyeing | |
|---|---|---|---|---|---|
| | | | | Direct | Developed (b-naphthol) |
| 3 | 3:3'-diamino azoxybenzene | 1 - (m - amino - phenyl) - 5 - pyrazolone - 3 - carboxylic acid. | 1-naphthylamine-6-sulfonic acid | Yellow orange | Brown. |
| 4 | p - Amino - benzoyl - m - phenylene diamine. | ___do___ | 1-naphthylamine-(mixed 6 and 7)-sulfonic acid. | ___do___ | Do. |
| 5 | ___do___ | ___do___ | 2 - amino - 5 - naphthol - 7 - sulfonic acid. | Orange | Reddish brown. |
| 6 | ___do___ | ___do___ | 2(p-amino benzoyl) naphthylamine - 5 - napthhol - 7 - sulfonic acid. | ___do___ | Orange. |
| 7 | ___do___ | ___do___ | 1 - (m - amino phenyl) - 5 - pyrazolone-3-carboxylic acid. | Yellow | Do. |
| 8 | Benzidine 3:3'-disulfonic acid | 1 - meta - amino - phenyl - 3 - methyl-5-pyrazolone. | 1 - meta - amino - phenyl -3 - methyl-5-pyrazolone. | ___do___ | Do. |
| 9 | ___do___ | ___do___ | 1 - meta - amino - phenyl - 5 - pyrazolone-3-carboxylic acid. | ___do___ | Do. |
| 10 | ___do___ | ___do___ | Cresidine | Orange | Red. |
| 11 | ___do___ | ___do___ | J-acid | Red-orange | Do. |
| 12 | ___do___ | ___do___ | (Para-amino-benzoyl)-J-acid | Orange | Orange. |
| 13 | ___do___ | 1 - meta - amino - phenyl - 5 - pyrazolone-3-carboxylic acid. | Cresidine | ___do___ | Brown. |

Examples 7, 8, and 9 give yellow dyes when developed with 1-phenyl-3-methyl-5-pyrazolone. These dyeings have superior fastness to washing.

The dyestuffs are represented generally by the formula

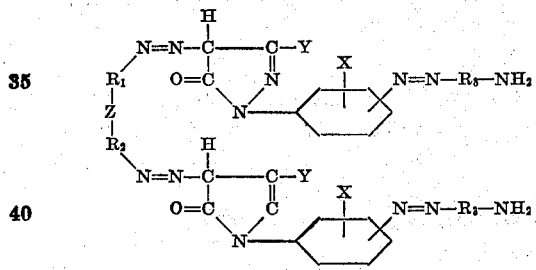

The group —R₁—Z—R₂— is the residue after diazotization of a di-amino-aryl compound having two aryl nuclei. R₁ and R₂ are like or unlike benzene or naphthalene nuclei which may be unsubstituted or substituted once or more than once by alkyl, alkoxy, sulfonic acid, carboxyl or halogen, such as chloro, bromo, methyl, ethyl, propyl, butyl, the corresponding alkoxy groups and still others. The amino groups must be present in different aryl nuclei and be capable of diazotization, either concurrently or consecutively in order to produce a tetrazo compound. The two aryl nuclei may be directly united, such as diamino derivatives of diphenyl or they may be united by intermediate groups. The following are illustrations of compounds which can be used instead of diphenyl compounds and the intermediate groups are given.

| | |
|---|---|
| 4:4'-di-amino-stilbene | —CH=CH— |
| 4:4'-di-amino-di-benzyl | —CH₂—CH₂— |
| 4:4'-di-amino-diphenyl methane | —CH₂— |
| 4:4'-di-amino-diphenyl ether | —O— |
| 4:4'-diamino-benzophenone | —C(=O)— |
| 3:3'-di-amino-azoxy-benzene | azoxy |
| m-Amino-benzoyl-m-phenylene diamine | —N(H)—C(=O)— |
| 1:3-di(amino-benzoyl-amino)-benzene | —C(=O)—N(H)—C₆H₄—N(H)—C(=O)— |
| 4-amino-naphthoyl-m-phenylene diamine | —C(=O)—N(H)— | cleus may be unsubstituted or substituted by alkyl, alkoxy, halogen sulfonic acid or carboxyl. The amino group is preferably in the 3-position of the aryl nucleus and the pyrazolone ring may be additionally substituted by methyl or carboxyl in the 3-position thereof.

The end component of the dyestuff is any azo dye coupling component having a diazotizable amino group, such as amino benzenes, naphthylamines, hydroxy substituted amino-benzenes and naphthylamines and amino-substituted phenylpyrazolones. The aryl nuclei of these compounds may be unsubstituted or they may be substituted once or more than once by alkyl, alkoxy, halogen, hydroxy, sulfonic acid and carboxyl. In coupling some unsubstituted compounds such as aniline it is necessary to use the omega sulfonic acid derivative as the parent substance and then hydrolyze after coupling to produce the diazotizable amino group. Otherwise the parent substances described can generally be directly coupled. For economically producing dyestuffs having generally good properties the compounds of benzene and naphthalene are preferred, but others can be used with good results.

Among the preferred compounds to be coupled as the end components are 1-naphthylamine-6-sulfonic acid, 1-naphthylamine-7-sulfonic acid and mixtures of these compounds.

The products containing 2 to 4 solubilizing groups, such as sulfonic acid and carboxyl have the most desired solubility. Products containing two sulfonic acid groups and two carboxyl groups are preferred. The carboxyl groups are preferably substituted in the pyrazolone ring and the sulfonic acid groups are present in the end components.

In the preferred embodiments the aryl nuclei of the middle di-aryl-diamine are substituted or unsubstituted benzene nuclei with an intervening azoxy or —NHCO— group, the pyrazolone ring is substituted by carboxy and the end groups are naphthylamines substituted by sulfonic acid in the 6 or 7 positions with respect to the amino groups.

Since from the foregoing description of the invention it will be apparent to those skilled in the art that many embodiments of the invention may be made without departing from the spirit and scope thereof, it is to be understood that no limitations are intended in the annexed claims except those which are specifically recited or are imposed by the prior art.

It is claimed:

1. A dye which in the form of its acid is represented by the formula

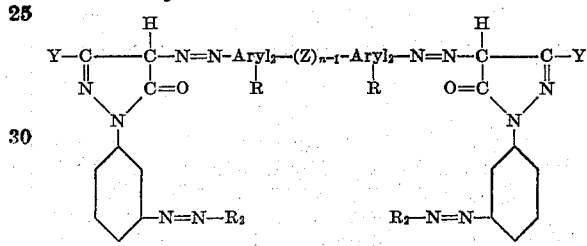

in which each $R_2$ is the residue after coupling of one of a group consisting of a 1-(amino phenyl)- 5-pyrazolone carboxylic acid, a 1-(amino phenyl)- 3-methyl-5-pyrazolone, compounds having benzene, naphthalene, hydroxy benzene and naphthol nuclei which are substituted once by one of a group consisting of amino and amino-benzoylamino and derivatives of said amino benzenes, naphthylamines, hydroxy benzenes and naphthols in which the aryl nuclei are substituted by not more than two members of a group consisting of alkyl, alkoxy and sulfonic acid; each Y is one of a group consisting of methyl and carboxy; each aryl₂ is one of a group consisting of benzene and naphthalene radicals; R is from the group consisting of hydrogen, alkyl, alkoxy, halogen, carboxy and sulfonic acid; Z is one of a group consisting of

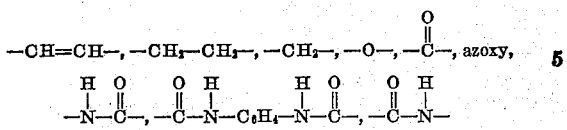

and $n$ is an integer not greater than 2, said compound having at least two solubilizing groups.

2. A compound represented by the formula

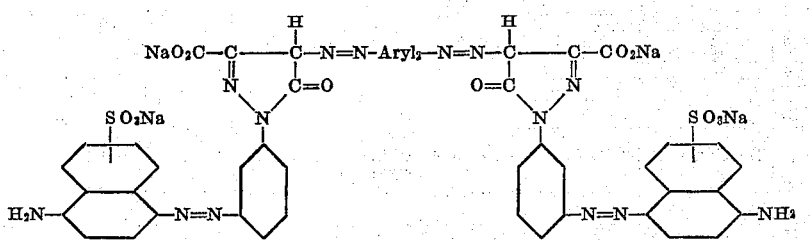

in which Aryl₂ is the radical

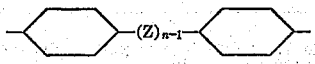

in which Z is one of the group consisting of

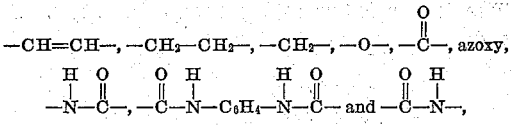

and $n$ is an integer not greater than 2.

3. A compound represented by the formula

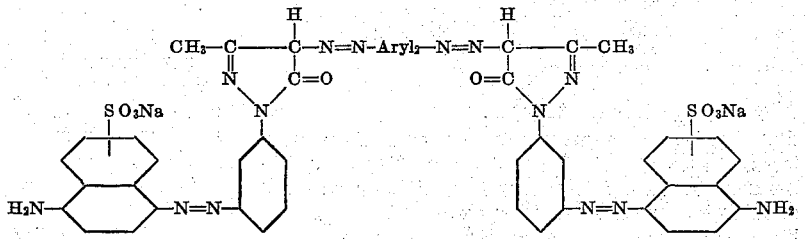

in which Aryl₂ is the radical

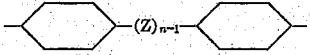

in which Z is one of the group consisting of

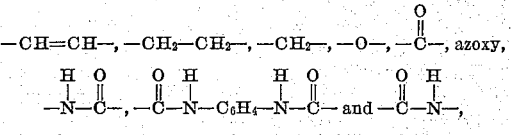

and $n$ is an integer not greater than 2.

4. A compound represented by the formula

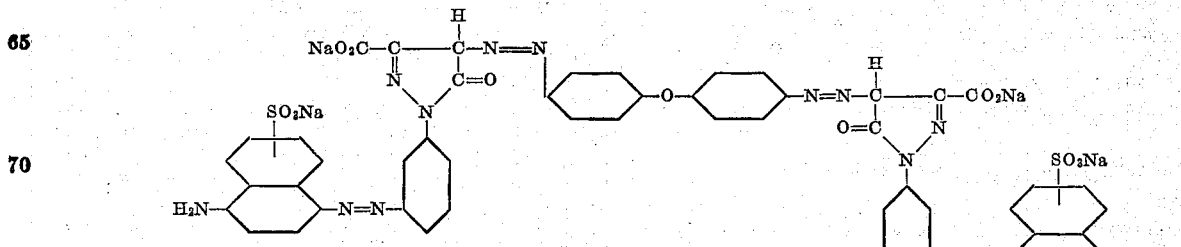
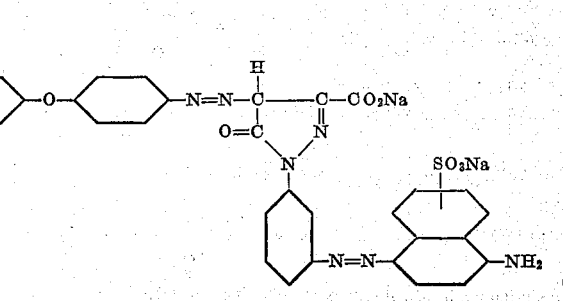

in which —SO₃Na is in one of the positions 6 and 7 with respect to the amino group.

5. A compound represented by the formula

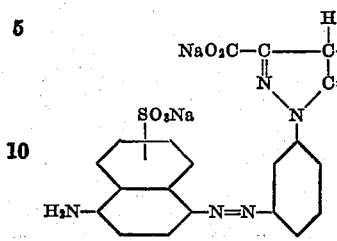

in which —SO₃Na is in one of the positions 6 and 7 with respect to the amino group.

6. The process which comprises coupling two molecular proportions of a 1-(amino-phenyl)-5-pyrazolone to one molecular proportion of a fully diazotized di-amino-aryl compound represented by the formula

in which Z is one of the group consisting of

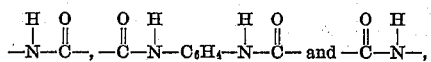

and $n$ is an integer not greater than 2, diazotizing the product of coupling and coupling to two molecular proportions of a primary amino-aryl-sulfonic acid.

7. The process which comprises coupling two molecular proportions of a 1-(amino-phenyl)-5-pyrazolone carboxylic acid to one molecular pro-

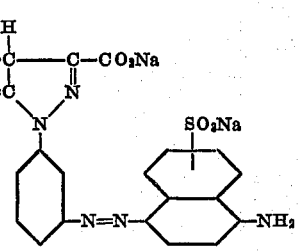

portion of a fully diazotized compound of the type

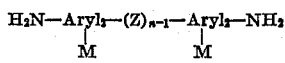

in which Aryl₂ is one of the group consisting of benzene and naphthalene nuclei, M is one of the group consisting of hydrogen, alkyl, alkoxy, halogen, carboxyl and sulfonic acid, Z is one of the group consisting of

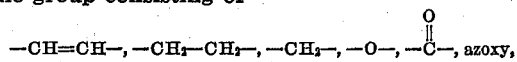
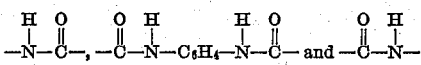

and $n$ is an integer not greater than 2, diazotizing the product of coupling and coupling to an azo dye coupling component which is substituted by a diazotizable amino group.

MARGARET R. MURPHY,
*Administratrix of the Estate of Arthur R. Murphy, Deceased.*
SWANIE S. ROSSANDER.

CERTIFICATE OF CORRECTION.

Patent No. 2,191,800. February 27, 1940.

MARGARET R. MURPHY, ADMINISTRATRIX
of ARTHUR R. MURPHY, ET AL.

It is hereby certified that error appears in the printed specification of the above numbered patent requiring correction as follows: Page 3, first column, line 39-40, for that portion of the formula appearing as

  read  

and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.